Sept. 3, 1963  D. T. SHORE ETAL  3,102,813
PROCESSING OF BREWERS' WORT
Filed Nov. 14, 1960

INVENTORS
David Teignmouth Shore
and George Frederick Bird
BY Baldwin & Wight
ATTORNEYS

United States Patent Office 3,102,813
Patented Sept. 3, 1963

3,102,813
PROCESSING OF BREWERS' WORT
David Teignmouth Shore, Banstead, and George Frederick Bird, Sheffield, England, assignors to The A.P.V. Company Limited
Filed Nov. 14, 1960, Ser. No. 68,969
Claims priority, application Great Britain Nov. 20, 1959
5 Claims. (Cl. 99—52)

This invention relates to the processing of brewers' wort by either the batch method of operation or, more especially, the continuous processing method in which wort is in continuous movement through the plant from the mashing stage, through the boiling stage and the hopping stage to the fermentation stage, the wort being converted during the movement from sweet wort to hopped wort.

In such a method, the hopped wort is at present clarified or filtered before reaching the fermentation stage by various forms of filter, and one which is commonly employed is the diatomaceous earth filter. The known filters, although serving to carry out a filtering action, may impair the quality of the final product by removing valuable wort constituents along with the unwanted sediment and, as an additional plant item, contribute to the general wort losses in the system.

The main purpose of the present invention is to provide a wort processing action which will further hop extraction and will, at the same time, provide wort filtration without serious loss of valuable wort constituents.

Broadly stated, the present invention consists in effecting a filtration of the wort by causing that wort to flow through a hop bed which is quiescent so that it operates as a filter bed as well as ensuring the extraction of valuable hopping substances.

Wort, whether before or after the primary hopping stage, in passing through such a quiescent hop bed is subjected to an efficient filter action without the quality of the hot wort being impaired. It is preferred to pass the wort through a bed formed by spent hops (i.e., hops that have been previously used for the primary hopping stage) before passing the wort to the main hop bed which contains fresh hops. In this way, the efficiency of hop extraction is considerably improved.

The formation of the filtering hop bed in any particular filter and/or extractor vessel can be achieved by causing wort which has been hopped in a vessel to pass back to the inlet of the vessel, thus causing a recirculation of the wort in the vessel and eventually the formation of the quiescent filter bed, the precipitated hot trub being uniformly dispersed in the hop material.

Figure 1:
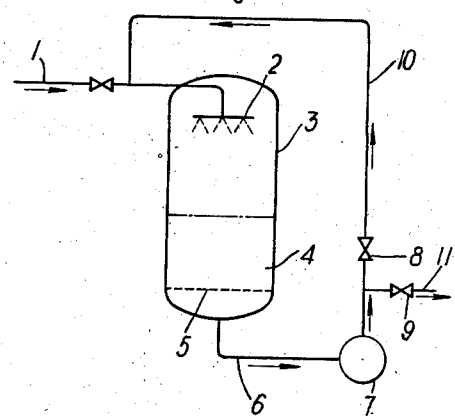
Figure 2:
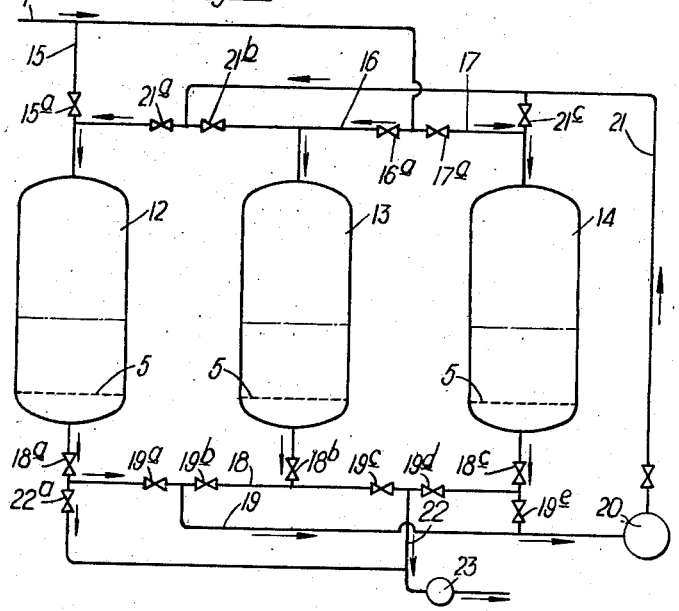

The invention is illustrated in the accompanying drawings which shows in diagrammatic form the parts of two installations: in FIGURE 1 is shown an arrangement in which a single hop-containing vessel is used both for the hop enrichment of the sweet wort and for the clarification or filtration of that wort by recirculation: in FIGURE 2 is shown an arrangement in which three hop extraction vessels are used with control valves enabling any one of the vessels to be used as the primary hop extraction vessel and the others to be used (after being employed for the primary hop extraction) respectively for filtration and re-charging with fresh hops.

In FIGURE 1 sweet wort passes from the usual mashing stage through a pipeline 1 to a sparging head 2 in a hopping vessel 3 in which hops are contained to form a filter bed 4; the filter bed rests on a foraminated plate 5 below which a connection is established by a withdrawal pipe 6 which is connected to a pump 7, preferably of the centrifugal type.

The discharge side of the pump is connected via valves 8, 9 to pipes 10, 11; the pipe 10 is a return pipe extending back to the supply line 1; the pipe 11 extends on to apparatus of any usual form for the continual treatment of the wort; such apparatus can be a hop extraction vessel such as that shown at 3 for the further hop enrichment of the wort now clarified by the hop bed in the vessel 3, or to a flash vessel which causes the wort to flash-off certain volatile impurities.

Thus, by manipulation of the valves 8, 9 some part of the wort flow can be taken back to the supply pipe 1 so as to be recirculated through the hop bed 4 for the purpose of being filtered and clarified by that bed, and some part of the flow can be passed on for further treatment.

Alternatively, the valves 8, 9 can be operated to cause the wort flow to be continuously recirculated in the vessel 3 until the wort output is of sufficient clarity due to filtration, whereupon the valves can be operated to direct the filtered hopped wort through the line 11 for further treatment.

In FIGURE 2 is shown an installation using three hopping vessels 12, 13, 14; in this case the supply pipe 1 has three branches 15, 16, 17 extending via control valves 15$^a$, 16$^a$, 17$^a$ respectively to the three vessels; the vessels are connected through flow regulating valves 18$^a$, 18$^b$, 18$^c$ to a discharge line 18.

This line has a branch connection 19 to a recirculation pump 20, the outlet of which is taken back through a pipeline 21 to the supply side of the vessels under the control of valves 21$^a$, 21$^b$, 21$^c$. The line 18 has a second branch 22 by which the hopped and clarified wort is passed on for further treatment. The flow between the two lines 18, 19 is controlled by diversion valves 19$^a$, 19$^b$, 19$^c$, the hopped and clarified wort being moved in the line 22 by a pump 23.

The various valves enable the sweet and/or hopped wort flow to be diverted selectively so as to cause any one of the vessels 12, 13, 14 to be used as the primary hop extraction vessel to hop the sweet wort, and the other vessel or vessels as a filter vessel; the valves can then be operated to switch that vessel into the hopped wort flow line to act as a filter when the hops in that vessel have become spent so far as the primary extraction is concerned. The control valves would also enable any one of the vessels to be shut down to enable the hops, when spent by a hopping and filtering action, to be replaced by fresh hops so that by manipulation of the valves, this recharged vessel can be brought back into service as a primary hop extraction vessel and so on.

In the arrangement shown, the vessel 12 will be regarded as the primary hop extraction vessel containing a fresh charge of hops; the vessel 13 can be regarded as having been used for the primary hop extraction and so contains a hop bed which can be used for filtration; the vessel 14 can be regarded as containing a hop bed which is spent or is otherwise out of commission. The valves for operating the system in this manner would be actuated as follows:

The following valves would be opened: 16$^a$, 18$^a$, 18$^b$, 19$^b$, 22$^a$, 21$^a$.

The following valves would be closed: 15$^a$, 17$^a$, 18$^c$, 19$^a$, 19$^c$, 19$^d$, 19$^e$, 21$^c$, 21$^b$.

Thus, the flow of wort is from the line 1 via the valve 16$^a$ to clarification in the vessel 13, thence via the valves 18$^b$ and 19$^b$ to the line 19 from which the wort is delivered by the pump 20 to the line 21, and thence via the valve 21$^a$ to the vessel 12 containing the fresh hop bed. The hopped and filtered wort now passes via the valves 18$^a$, 22$^a$, line 22 to the pump 23 which passes on the clarified hopped wort for delivery and further treatment; in the meantime, the vessel 14 is isolated entirely from the flow so that its spent hop bed can be removed and replaced by a fresh hop bed which, by manipulation of the valves, can thus be brought into hopping service in replacement of the vessel 13 which will itself replace the vessel 12, and so on.

After a predetermined time cycle, the valves are set to enable filtration to occur in vessel 12 and extraction in vessel 14; to achieve this, the following valves would be opened: 15$^a$, 18$^a$, 19$^a$, 21$^c$, 18$^c$, 19$^d$. The following valves would be closed: 21$^a$, 21$^b$, 16$^a$, 17$^a$, 19$^b$, 19$^c$, 19$^e$, 18$^b$, 22$^a$.

Thus, the flow of wort is from the line 1 via the valve 15$^a$ to clarification in the vessel 12 containing the spent hops, thence via the valves 18$^a$, 19$^a$ to the line 19 from which the wort is delivered by the pump 20 to the line 21, and thence via the valve 21$^c$ to the vessel 14 containing the fresh hop bed. The hopped clarified wort now passes via the valves 18$^c$, 19$^d$ to the line 22 and to the pump 23 which passes on the clarified hopped wort for delivery and further treatment. In the meantime, vessel 13 containing spent hops is completely isolated from the flow so that its spent hops can be removed and replaced by a fresh hop bed.

It will be seen that the invention is well adapted for incorporation in a continuous processing method for the wort is in continuous movement, and although it may, when a single hop extraction vessel is used, be recirculated in part through that vessel, the hopped wort would still have an overall continuous forward progression to the fermentation stage. Thus the filtering action of this invention can with advantage be applied to the continuous processing of wort by the invention described and claimed in the specification of Patent No. 2,948,617.

It will be understood that the hopped filtered wort will, on leaving the filtering stage, pass through the usual cooling stages before reaching the fermentation stage.

We claim:

1. A method for clarifying and hopping sweet brewers' wort comprising establishing a plurality of separate quiescent hop beds; clarifying the wort by flowing it through a first hop bed, being of hops which have previously been subjected to the passage of wort therethrough; and subsequently hopping the so clarified wort by flowing it through a second hop bed, being of fresh hops.

2. A method of clarifying and hopping sweet brewers' wort comprising establishing a plurality of separate quiescent hop beds; clarifying the wort by flowing it through a first hop bed, being of hops which have previously been subjected to the passage of wort therethrough; subsequently hopping the so clarified wort by flowing it through a second hop bed, being of fresh hops; and, when said second hop bed has become spent, switching the flow of wort to flow firstly through said second hop bed and then through a third and fresh bed of hops.

3. A method of clarifying and hopping sweet brewers' wort comprising establishing a plurality of separate quiescent hop beds; clarifying the wort by flowing it through a first hop bed, being of hops which have previously been subjected to passage of wort therethrough; subsequently hopping the so clarified wort by flowing it through a second hop bed, being of fresh hops; and, when said second hop bed has become spent, diverting the flow of wort from said first hop bed and switching the flow of wort to flow firstly through said second hop bed and then through a third and fresh bed of hops.

4. A method according to claim 3 in which said first hop bed is renewed while the flow of wort is passing firstly through said second hop bed and then through said third bed, and in which, when said second hop bed becomes spent, the flow is shifted to pass firstly through said third bed and then through the renewed first bed while said second bed is being renewed, whereby the wort will flow continuously firstly through a bed of spent hops, which previously have been subjected to passage of wort therethrough, and then through a bed of fresh hops.

5. Apparatus for producing hopped and clarified brewers' wort, comprising three vessels containing respective quiescent beds of hops; sweet wort supply means; hopped wort discharging means; and means comprising ducts and valves connected to said supply means, said vessels and said discharging means, said valves being selectively settable to establish: a first flow path condition in which the wort is directed to flow from said supply means through a first of said vessels out of the bottom thereof and then through a second of said vessels out of the bottom thereof and hence to said discharging means, the third of said vessels then being cut off from communication with said supply means, said first and second vessels and said discharging means; a second flow path condition in which the wort is directed to flow from said supply means through said second of said vessels out of the bottom thereof and then through said third of said vessels out of the bottom thereof and thence to said discharging means, said first of said vessels then being cut off from communication with said supply means, said second and third vessels and said discharging means; and a third flow path condition in which the wort is directed to flow from said supply means through said third of said vessels out of the bottom thereof and then through said first of said vessels out of the bottom thereof and thence to said discharging means, said second of said vessels then being cut off from communication with said supply means, said first and third vessels and said discharging means.

References Cited in the file of this patent

UNITED STATES PATENTS

| 66,833 | Haight | July 16, 1867 |
| 447,131 | Griffiths | Feb. 24, 1891 |
| 2,967,107 | Geiger et al. | Jan. 3, 1961 |

OTHER REFERENCES

Wallerstein Communications, vol. XVIII, No. 57, June 1954, pp. 127 to 131; pp. 130 to 131 relied upon. (Copy in Div. 63.)